April 7, 1953   J. B. MYERS   2,633,812
MOLD FOR FROZEN CONFECTIONS
Filed May 22, 1951

INVENTOR
JAMES B. MYERS
BY *Hyman Hurvitz*
ATTORNEY

Patented Apr. 7, 1953

2,633,812

UNITED STATES PATENT OFFICE 2,633,812

MOLD FOR FROZEN CONFECTIONS

James B. Myers, Huntington, W. Va.

Application May 22, 1951, Serial No. 227,622

1 Claim. (Cl. 107—19)

The present invention relates generally to ice cream molds, and more particularly to devices for molding frozen confections having axially located fillings of nuts, and/or fruit, or the like.

It is a broad object of the invention to provide an improved ice cream mold.

It is a more specific object of the invention to provide a mold for frozen confections which is readily separable into its component parts for cleaning, yet which is economical to fabricate, subject to substantially no maintenance, convenient in use, sturdy, and effective for large scale commercial operation.

The above and still further features, objects and advantages of the invention will become more apparent upon consideration of the following detailed description of a specific embodiment thereof, especially when taken in conjunction with the accompanying drawings, wherein.

Figure 1:
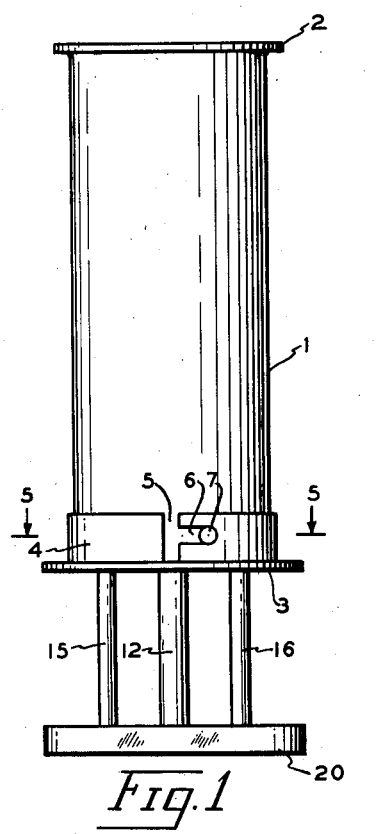
Figure 1 is a view in front elevation of a device embodying my invention.
Figure 2:
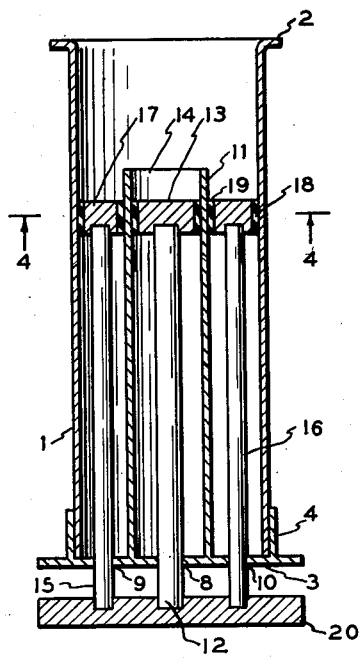
Figure 2 is a view in longitudinal cross section, of the structure of Figure 1.
Figure 3:
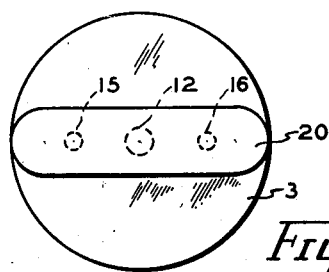
Figure 3 is a view in plan of Figure 1, as viewed from the bottom.
Figure 4:
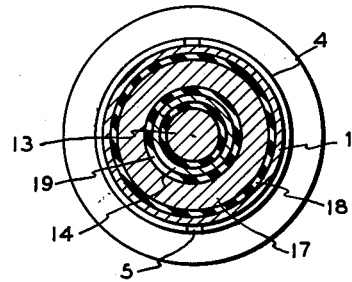
Figure 4 is a transverse section taken on the line 4—4 of Figure 2.
Figure 5:
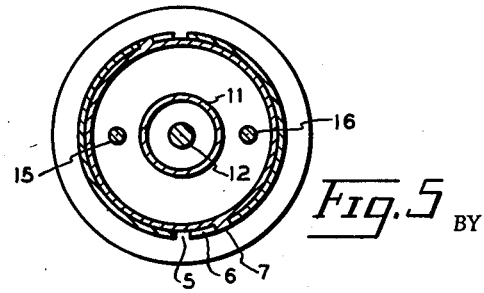
Figure 5 is a view in transverse section taken on the line 5—5 of Figure 1.

Briefly described, I provide an outer cylinder having an open top, and a detachable closure at its bottom. To the latter is secured a hollow inner cylinder, open at its upper end, and having a diameter smaller than that of the cylindrical mold, and of lesser length, and so disposed with respect to the detachable bottom as to extend axially of the cylindrical mold for a portion of the length of the latter.

The inner cylinder may, when the structure is utilized for the production of frozen confections, be filled with fruit, nuts and the like, or any of these, and the outer cylinder may be filled with ice cream in liquid form, suitable for solidification by freezing, and which may be solidified in the mold.

A pair of pistons is provided, one of which extends within the hollow inner cylinder, and the other of which extends between the outer wall of the inner cylinder and the inner wall of the outer cylinder. The pistons may be actuated by means of rods, which extend through apertures provided in the detachable closure, and which are simultaneously actuable to eject the solidified ice cream, and the contents of the inner cylinder, through the open top of the outer cylinder.

Obviously, the ejection may take place, in practice, with the mold inverted, or in any other position, and ejection with the mold inverted is, in fact, the normal practice in the industry. Further, a large number of molds (not shown) may be simultaneously employed, in the mass production of frozen confections, in which case ejection may take place from all the molds simultaneously, and to that end all the molds may be supported from a common form (not shown).

Referring now more specifically to the accompanying drawings, the reference numeral 1 denotes a hollow metallic cylinder, having a small outwardly extending lip 2 at its upper end, and having a uniform diameter from its upper end to its lower end, the latter being open. An annular closure plate 3 may be provided, having an upwardly extending annular wall 4, the latter having an inner diameter substantially equal to the outer diameter of the cylinder 1, so as to provide a snug fit, when conjoined therewith. A vertical slot 5 may be provided in the wall 4, from which extends at right angles a circumferential slot 6, adapted to mate with a pin 7 secured to the outer wall of the cylinder 1, or extending therethrough, as may be convenient. Accordingly, it will be evident that the slots 5 and 6 together with the pin 7 provide a form of bayonet coupling between the cylinder 1 and the closure structure 3, 4, which establishes a firm conjunction of these two elements, yet which leaves the bottom structure readily detachable, when desired.

There are provided in the closure wall 3, a central aperture 8 and two further apertures 9 and 10, disposed on a diameter of the wall 3. Extending in the same direction as the annular wall 4 concentrically with the central aperture 8, is an inner hollow cylinder 11, secured at its lower end to the closure wall 3, and extending in length for a distance substantially less than the length of the outer cylinder 1. Accordingly, when the closure structure 3, 4 is secured to the outer cylinder 1, the inner cylinder 11 extends axially of the outer cylinder 1, for a portion only of its length.

Extending through the central aperture 8 is an actuating rod 12, to the upper end of which is secured a piston 13 of circular cross section, and adapted to slide within the inner cylinder 11. The piston 13 may be fabricated of metal, in which case a suitable plastic or hard rubber bearing surface 14 may be provided circumferentially of the piston 13, in order to avoid metal to metal friction between the piston 13 and the inner wall of the inner cylinder 11, which might result in the production of metallic particles, and consequently a discoloration of the frozen confection.

There are further provided two piston actuating rods 15 and 16, which extend through the apertures 9 and 10, in which are secured at their upper ends to an annular piston 17, which slides between the inner wall of the outer cylinder 1 and the outer wall of inner cylinder 11. The bearing surfaces of the piston 17, as is the case with the piston 13, may be provided with circumferential bearing surfaces 18, 19, of plastic or synthetic rubber, or the like, which respectively bear against the inner wall of the cylinder 1 and the outer wall of cylinder 11, to avoid metal to metal friction.

The lower ends of the actuating rods 12, 15 and 16 are secured in common to a bar 20 which may have any convenient shape, and which may be readily grasped by the hand, when it is desired to actuate the pistons 13 and 17.

In utilizing the molding equipment in which is embodied the present invention, the pistons 15 and 17 may first be withdrawn. The inner cylinder 11 may then be filled with nuts, fruit, jelly, or any other desired filling for the confection, and thereafter ice cream in liquid or unfrozen state may be poured into the outer cylinder 1, until the mold is substantially filled. The ice cream may then be frozen. When the ice cream has been frozen, the entire confection may be removed from the mold by applying force against the handle 20, thereby actuating the pistons 13, 17 toward the top or open end of the cylinder 1. The inner piston 13 and the outer piston 17 move identically, and maintain the relative positions of the filling and of the ice cream until the piston 13 has reached the top of the inner cylinder 11. Thereafter the frozen confection may be readily removed from the mold. It will be obvious that the walls of the inner cylinder 11 should be made as thin as is compatible with proper strength, and that the pressure of the piston 13 against the inner filling, will force the latter into contact with the frozen confection or ice cream, during the process of removal of the molded confection, thus taking up the slack which is introduced by the thickness of the inner wall 11.

When it is desired to clean the mold, the closure 3, 4 may be removed, by twisting the closure to unlatch the bayonet coupling 5, 6, 7, sufficiently to place the pin 7 in the slot 5, after which the cover may be removed by an axial force. When the closure 3, 4 is removed the piston structures and the inner cylinder 11 are removed therewith, leaving the outer cylinder 1 without any appended structure, except the pin 7. The various components of the mold may then be cleaned and reassembled in readiness for further operation.

If desired, the inner cylinder 11 may be filled while the mold is in disassembled position, and thereafter the mold assembled and the liquid ice cream inserted. This mode of filling provides for complete and easy access to the interior of the inner cylinder 11, which otherwise would be lacking.

Various other modes of utilizing the mold of the present invention will suggest themselves to those skilled in the pertinent art, and it will be apparent for example, that the final product may be coated, or uncoated, and that various types of coating may be employed, as desired.

While I have described and illustrated one specific embodiment of my invention it will become evident to those skilled in the art that variations in detail may be resorted to without departing from the true spirit of the invention as defined in the appended claim.

What I claim is:

An ice cream mold comprising an outer hollow cylinder open at both ends and having a length at least twice its diameter, a detachable closure securable to one end of said outer hollow cylinder, an inner hollow cylinder having a diameter of the order of half the diameter of said outer cylinder and having one end permanently secured to said detachable closure in such position that when said detachable closure is secured to said one end of said outer hollow cylinder said inner hollow cylinder and said outer hollow cylinder are substantially co-axial, said outer hollow cylinder being longer than said inner hollow cylinder by a factor of between ten percent and fifty percent, a first relatively thin disc shaped cylindrical piston, a second relatively thin annular piston, said first piston slidable within and in contact with said inner cylinder, said second piston slidable in the space between said inner hollow cylinder and said outer hollow cylinder and in contact with the outer wall of said inner cylinder and the inner wall of said outer cylinder, and piston actuating rods extending through apertures in said detachable cover in a sense parallel with the axis of said cylinders and secured to said pistons to enable actuation of said first and second pistons identically and concurrently.

JAMES B. MYERS.

REFERENCES CITED

The following references are of record in the file of this patent:

UNITED STATES PATENTS

| Number | Name | Date |
| --- | --- | --- |
| 1,372,949 | Henneberry | Mar. 29, 1921 |
| 1,486,445 | Mayol | Mar. 11, 1924 |
| 1,602,331 | Britton | Oct. 5, 1926 |
| 1,664,337 | Vanderput | Mar. 27, 1928 |
| 1,709,280 | Ost | Apr. 16, 1929 |
| 2,123,836 | Thomas et al. | July 12, 1938 |
| 2,137,811 | Royal | Nov. 22, 1938 |
| 2,309,133 | Moore | Jan. 26, 1943 |